Nov. 27, 1951     B. W. JONES     2,576,347

GUN TELESCOPE MOUNTING

Filed Oct. 11, 1950

INVENTOR.
BURR W. JONES
BY
*G. A. Ellestad*
ATTORNEY

Patented Nov. 27, 1951

2,576,347

UNITED STATES PATENT OFFICE 2,576,347

GUN TELESCOPE MOUNTING

Burr W. Jones, Rochester, N. Y., assignor to Bausch & Lomb Optical Company, Rochester, N. Y., a corporation of New York Application October 11, 1950, Serial No. 189,645

5 Claims. (Cl. 33—50)

1

This invention relates to improvements in gun telescope mountings and more particularly to windage adjustment mechanism by means of which the telescope may be moved laterally relative to the gun barrel.

The design of gun telescope mountings, such as the mounting herebelow described, which permits quick demountability of the telescope, necessitates the provision of means to assure that the telescope may be repeatedly remounted in a correct sighting position on the gun. It is particularly desirable to provide means for preventing the telescope from moving on its seat when windage adjustments are made so that the reticle in the telescope always remains upright.

It is an object of this invention to provide a gun telescope mounting of the above-mentioned type which embodies improved means for adjusting the lateral position of the telescope to effect windage adjustments to the line of sight.

A further object is to provide such a device which is simple and rugged in construction, reliable in operation, and easy to adjust and maintain in good working condition.

Other objects are to provide such a device in which lateral adjustment of the telescope is effected by turning a helical seat in which the telescope rests and to provide guide means for preventing movement of the telescope in its seat when the lateral adjustments are made.

Figure 1:
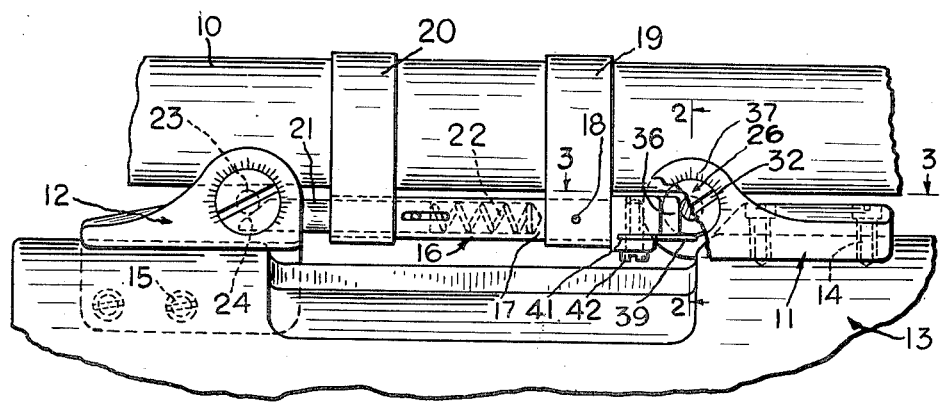
Figure 2:
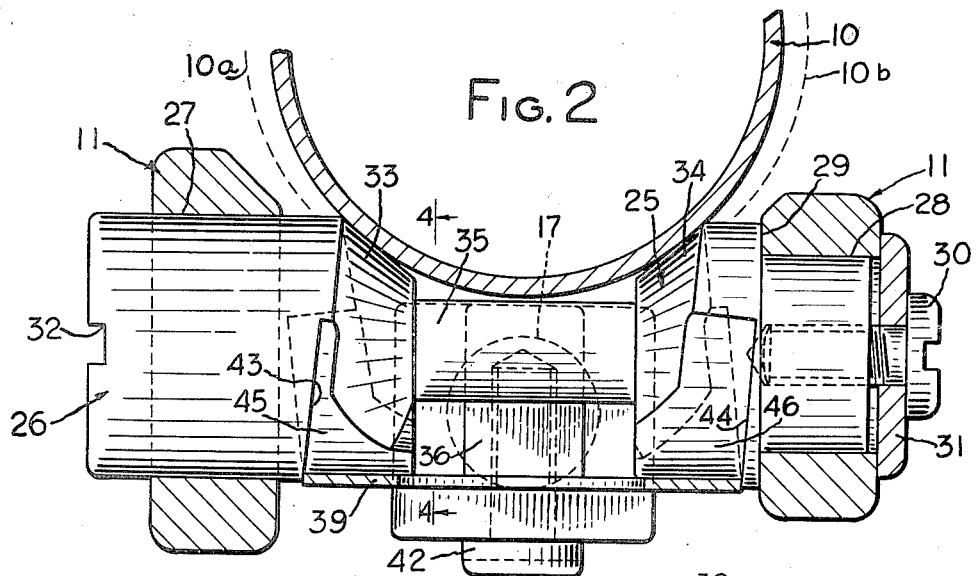
Figure 4:
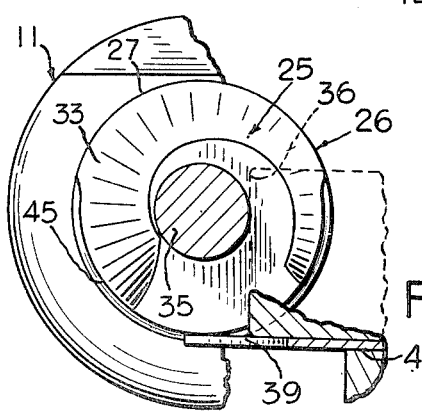

Further objects and advantages will be found in the novel details of construction and combination of parts by referring to the following description and accompanying drawing in which, Fig. 1 is a side view of a preferred form of my invention mounted on a gun, Fig. 2 is an enlarged sectional view taken on the line 2—2 of Fig. 1, Fig. 3 is a sectional view taken substantially on the line 3—3 of Fig. 1 with some parts broken away, and Fig. 4 is a cross-sectional view taken on the line 4—4 of Fig. 2 with some of the parts broken away.

Fig. 1 illustrates a quick-demountable type of mounting wherein part of a gun sighting telescope 10 is shown mounted on front and rear brackets 11 and 12, respectively, which are fixed on a gun barrel 13 by cap screws 14 and 15, respectively. Telescope 10 is demountably held thereon by any suitable yieldable clamping means, generally indicated by the numeral 16, such as shown and described in the pending patent application of D. T. Street, Serial No. 21,349, filed April 16, 1948. Such means comprises a bar 17,

2 anchored near its forward end by a pin 18 to a strap 19 which surrounds the telescope 10 and the bar. Near the rear of bar 17, a similar strap 20 is secured in any suitable manner to both the bar and telescope. The bar 17 is bored to receive a slidable locking pin 21 which is urged by a spring 22 into engagement with an abutment 23 on the rear bracket 12. An inclined surface 24 on the end of locking pin 21 serves to urge the telescope downwardly against its seat when the pressure of spring 22 is applied to the locking pin. The bracket 12 is provided with any suitable means for effecting vertical adjustments of the telescope 10. Devices for this purpose are disclosed, for example, in said application Serial No. 21,349.

According to my invention, the front part of telescope 10 is seated in a helical groove or channel 25 which is formed, in any preferred manner, between the ends of a round support member 26. This groove 25 preferably has an angular extent of at least 180° but it may be extended to 300° or more if smaller helix angles are desired for the same total axial advance of the groove. Support member 26 is mounted to turn about an axis in fitted openings 27 and 28 formed, respectively, in opposite sides of front bracket 11 and is held against axial movement therein by a shoulder 29 on said member which abuts the side of the bracket. Any preferred means such as a screw 30 threaded into the end of support member 26 and seated against a washer 31 overreaching opening 28 is provided to hold the shoulder 29 against the bracket. Formed in the opposite end of the support member 26 is a slot 32 in which a suitable instrument may be inserted for turning the member so as to cause the helical groove 25 to carry the telescope 10 laterally of the gun barrel 13 into either of the extreme lateral positions shown at 10a and 10b in Fig. 2. The axis about which the support member 26 turns is substantially coincident with the axis of the helical groove 25.

To provide a proper seat for the telescope 10, the helical groove 25 is provided with surfaces 33 and 34 which are inclined toward each other to provide a somewhat V-shaped seat so that the lower part of the telescope tube rests in the groove, as best shown in Fig. 2. The bottom portion of the helical groove 25 is reduced in size to form a cylindrical neck 35 concentric with the outside surface of the support member 26. The neck 35 serves as an abutment for a nose 36, see Figs. 3 and 4, on the forward end of the clamping mechanism 16 for locating the telescope longitudinally of the gun and both the neck and the nose are suitably proportioned so that the nose 36 may have limited freedom of movement along the neck 35 corresponding to the lateral movement of the telescope. Angular adjustment of the support member 26 is facilitated by an arcuate scale 37 formed in the side of bracket 11 and the cooperating index mark 38 on the surface at the slotted end of said member, as shown in Figs. 1 and 3.

In order to hold the telescope 10 resiliently against its seat formed by surfaces 33 and 34, a flat spring 39 is anchored horizontally in a slot 41 in the nose 36 so as to extend underneath the support member 26 and bear forcibly against it. Any suitable means for anchoring the spring 39 in the nose 36 may be provided such as a cap screw 42 which extends through a hole in the spring and is threaded into the nose, as shown in Fig. 1.

Another feature of this invention is the means for preventing the telescope from rolling on its seat 33, 34 when windage adjustments are made to the support member 26. In the preferred form, helical guide means are provided on the support member 26 comprising a pair of shallow helical shoulders 43 and 44, one being formed at either side of groove 25, by slightly reducing the diameter of the support member 26 at surfaces 45 and 46 adjacent to the groove. These shoulders 43 and 44 are spaced from each other at a distance to slidingly fit the sides of the flat spring 39 so as to maintain the reticle of the telescope 10 in an upright position when the telescope is moved by the groove 25 along the support member 26 as the latter is turned. The spring 39 overreaches the groove 25 considerably so as to lie against the bearing surfaces 45 and 46 which have sufficient area to resist wear. Regardless of whatever form of helical guide means is used, it is important that for equal angular displacements of the helical shoulders 43 and 44 and of the inclined sides 33 and 34 of the helical groove 25, there shall be corresponding equal axial displacements of all the helical surfaces.

Many alternate forms of the helical groove 25 and the helical guiding means 43 and 44 are possible in providing a windage adjustment for gun telescopes within the purview of this invention and changes may be made in the form and arrangement of its parts without departing from the spirit of the invention as defined in the claims hereto appended.

I claim:

1. In a gun telescope mounting having a bracket secured to a gun barrel and yieldable means for securing a telescope to the bracket to permit horizontal and vertical movements of the telescope, the combination of a support member mounted on the bracket to turn about an axis, said member having a helical groove formed therein, the opposite surfaces of the groove being inclined towards each other to form a substantially V-shaped seat for the telescope, the yieldable means urging the telescope onto said seat, the axis of the helical groove being substantially coincident with the first-named axis, and means for turning the member whereby the helical groove will effect lateral adjustments of the telescope.

2. In a gun telescope mounting having a bracket secured to a gun barrel and yieldable means for securing a telescope to the bracket so as to permit motion of the telescope in vertical and horizontal planes, the combination of a support member mounted to turn on said bracket, means co-acting with the member for preventing relative longitudinal movement between the member and bracket, said member having a helical groove formed therein between its ends, said groove having two opposite surfaces inclined toward each other to provide a substantially V-shaped seat on which the telescope rests, the yielding means holding the telescope against the surfaces of said seat, and means for turning said member whereby the groove will carry the telescope laterally of the gun barrel to effect lateral adjustments.

3. In a gun telescope mounting having a bracket secured to a gun barrel and clamping mechanism including yieldable means for securing a telescope to the bracket so as to permit motion of the telescope in vertical and horizontal planes, the combination of a support member mounted to turn in said bracket, a shoulder on the member, means for holding said shoulder in engagement with the bracket to prevent axial movement of the member, said member having a helical channel formed between its ends, two opposite surfaces of the channel being inclined to each other to provide a substantially V-shaped seat in which the telescope rests, the bottom of the channel being formed as a cylindrical neck which is coaxial with the turning axis of said member, said neck being in abutting relation with the forward end of said clamping mechanism, the yielding means holding the telescope against the surfaces of the seat, and means for turning said member whereby angular motion of the member causes the telescope to be moved laterally of the gun barrel by said helical channel to effect windage adjustments.

4. In a gun telescope mounting having a bracket secured to a gun barrel and clamping mechanism including yielding means for holding the telescope on the bracket so as to permit motion of the telescope in vertical and horizontal planes, the combination of a support member mounted to turn about an axis on said bracket, means on the member cooperating with the bracket for preventing relative longitudinal movement therebetween, a helical groove formed in said member intermediate of its ends, said groove having two opposite surfaces inclined toward each other to provide a substantially V-shaped seat on which the telescope rests, the yieldable means holding the telescope against the surfaces of the seat, said clamping mechanism further including a tongue which is in yielding contact with the underside of said member, helical guide means on said member operatively engaging the sides of said tongue to prevent the telescope from rolling during lateral adjustment thereof, said guide means having a helical advance along said axis which is the same as that of said groove for any given angular movement, and means for turning said member whereby angular movement of the member causes the groove to carry the telescope laterally of the gun barrel to effect windage adjustment and the engagement of the tongue and guide means holds the telescope against rolling movement.

5. In a gun telescope mounting having a bracket secured to a gun barrel and clamping mechanism including yielding means for securing a telescope to the bracket so as to permit motion of the telescope in vertical and horizontal planes, the combination of a support member mounted to turn about an axis in said bracket and having means thereon cooperating with the bracket for preventing relative longitudinal movement therebetween, a helical groove formed in said member intermediate its ends, said groove having two opposite surfaces inclined toward each other to provide a substantially V-shaped seat on which the telescope rests, the yieldable means holding the telescope against the surfaces of the seat, a pair of shoulders helically formed opposite to each other on said member and respectively adjacent to said sides, the corresponding parts of each said shoulders being axially equally spaced apart and the helical advance along the axis of said helically formed shoulders being the same as that of said groove for any given angular movement, said clamping mechanism further including a flat spring tongue fixed to said clamping mechanism and projecting into yieldable contact with the underside of said member to hold the telescope in said seat, the sides of said tongue being in abutting relation with the respective shoulders, and means for turning said member whereby angular movement of the member causes the groove to carry the telescope laterally of the gun barrel to effect windage adjustments and the engagement of the tongue between said pair of shoulders serves to prevent the telescope from rolling in its seat while the telescope is being adjusted laterally.

BURR W. JONES.

No references cited.